United States Patent
Hu et al.

(10) Patent No.: US 9,612,511 B2
(45) Date of Patent: Apr. 4, 2017

(54) PROJECTION SYSTEM USING EXCITABLE WAVELENGTH CONVERSION MATERIAL IN THE LIGHT SOURCE

(75) Inventors: Fei Hu, Shenzhen (CN); Yi Li, Pleasanton, CA (US); Yi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 144 days.

(21) Appl. No.: 13/594,187

(22) Filed: Aug. 24, 2012

(65) Prior Publication Data

US 2013/0050654 A1    Feb. 28, 2013

Related U.S. Application Data

(60) Provisional application No. 61/527,501, filed on Aug. 25, 2011.

(51) Int. Cl.
*G03B 21/20* (2006.01)
*G03B 33/06* (2006.01)

(52) U.S. Cl.
CPC ........... *G03B 21/204* (2013.01); *G03B 33/06* (2013.01)

(58) Field of Classification Search
CPC ....... G03B 21/14; G03B 21/28; G03B 21/204
See application file for complete search history.

(56) References Cited

U.S. PATENT DOCUMENTS

| | | | |
|---|---|---|---|
| 7,070,300 B2* | 7/2006 | Harbers | G02B 27/1046 257/E33.071 |
| 7,547,114 B2 | 6/2009 | Li et al. | |
| 8,545,032 B2* | 10/2013 | Chen | G03B 21/20 362/260 |

(Continued)

FOREIGN PATENT DOCUMENTS

| CN | 102023468 A | 4/2011 |
|---|---|---|
| CN | 102155639 A | 8/2011 |

(Continued)

OTHER PUBLICATIONS

Chinese Office Action, dated Jan. 20, 2014, in a counterpart Chinese patent application, No. CN 201110249345.7.

(Continued)

*Primary Examiner* — Bao-Luan Le
(74) *Attorney, Agent, or Firm* — Chen Yoshimura LLP

(57) ABSTRACT

A solid state light source device for generating a constant broad band light useful in multiple SLM projectors. The light source device includes a blue or UV/near UV excitation light and a moving plate carrying wavelength conversion materials to convert the excitation light into a broad band light. The wavelength conversion materials include red, green, yellow and/or blue phosphors, and may pass some of the blue excitation light. The broad band light outputted by the phosphor plate includes at least two primary color components and has a constant intensity and spectrum as a function of time. The solid state light source device further includes a second light source such as a blue light source, and a light combination device which combines the output light of the moving phosphor plate and the light from the second light source into one beam of constant, broad band light.

20 Claims, 12 Drawing Sheets

(56) References Cited

U.S. PATENT DOCUMENTS

| | | | |
|---|---|---|---|
| 8,662,678 B2* | 3/2014 | Hirata | G03B 21/20 |
| | | | 353/94 |
| 2005/0270775 A1* | 12/2005 | Harbers | G02B 27/1046 |
| | | | 362/231 |
| 2010/0314650 A1* | 12/2010 | Sugimori | 257/98 |
| 2010/0328626 A1* | 12/2010 | Miyazaki | 353/85 |
| 2011/0063581 A1 | 3/2011 | Iwanaga | |
| 2011/0149549 A1 | 6/2011 | Miyake | |
| 2011/0199580 A1* | 8/2011 | Hirata | G03B 21/20 |
| | | | 353/31 |
| 2011/0228232 A1* | 9/2011 | Sakata et al. | 353/31 |
| 2011/0242791 A1* | 10/2011 | Chen | G03B 21/20 |
| | | | 362/84 |
| 2011/0261326 A1* | 10/2011 | Wang et al. | 353/31 |
| 2011/0310353 A1* | 12/2011 | Maeda | 353/31 |
| 2012/0026721 A1* | 2/2012 | Kurt | F21K 9/56 |
| | | | 362/84 |
| 2013/0107226 A1* | 5/2013 | Aksenov | H04N 9/315 |
| | | | 353/31 |

FOREIGN PATENT DOCUMENTS

| | | | | |
|---|---|---|---|---|
| JP | 2003295319 A | | 10/2003 | |
| JP | WO 2011118345 A1 * | | 9/2011 | G03B 21/204 |

OTHER PUBLICATIONS

Chinese Office Action, dated Aug. 15, 2014, in a counterpart Chinese patent application, No. CN 201110249345.7.

* cited by examiner

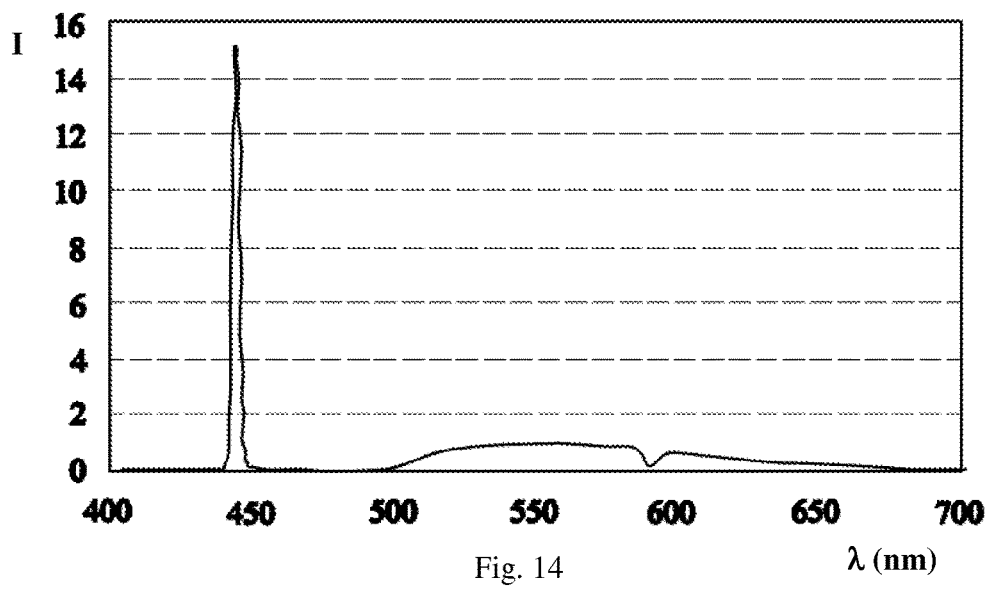
Fig. 14
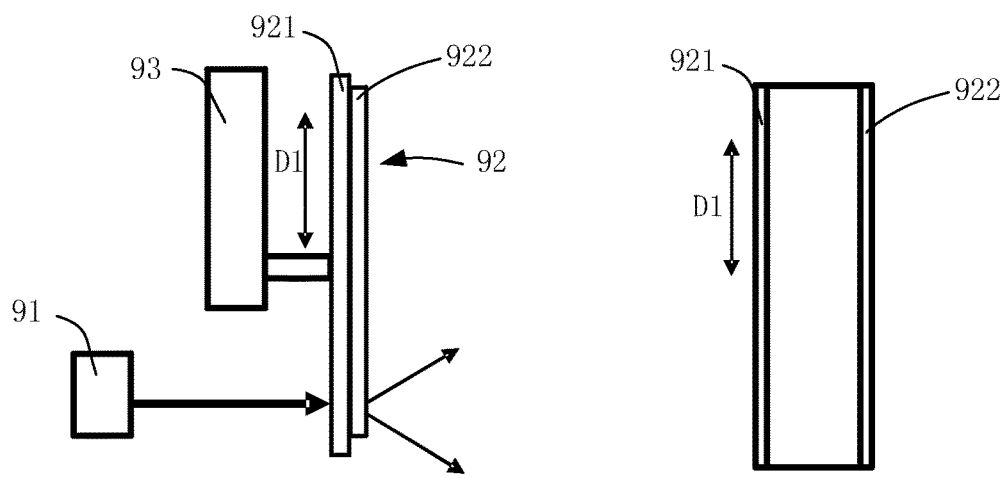
Fig. 15A
Fig. 15B

PROJECTION SYSTEM USING EXCITABLE WAVELENGTH CONVERSION MATERIAL IN THE LIGHT SOURCE

This application claims priority under 35 USC §119(e) from U.S. Provisional Patent Application No. 61/527,501, filed Aug. 25, 2011, which is herein incorporated by reference in its entirety.

BACKGROUND OF THE INVENTION

Field of the Invention

The present invention is in the technical field of light source. More particularly, the present invention is in the technical field of a special light source that can be used in those applications that requires high luminance, such as projection displays.

Description of the Related Art

Conventional light sources used in projectors are ultra high performance (UHP) lamps, where mercury plays an important role. An environmental-friendly technology is described in U.S. Pat. No. 7,547,114. In this light source structure, shown in FIG. 1 here, a solid-state light source 100 is used to emit excitation light through a focusing system 102, and a rotation phosphor wheel 104, in which several colorful phosphors are coated in different segments, is excited by the excitation light source to generate a light with a defined color sequence. A is the rotation axis of the color wheel. FIG. 4 of U.S. Pat. No. 7,547,114 (not reproduced here) shows this light source used in a single spatial light modulator (SLM) channels display system.

In the technology described in U.S. Pat. No. 7,547,114, the multiple colors are generated sequentially and combined into a white color in the time domain. When this device is used in a multiple spatial light modulator (SLM) channels display system, in which the multiple colored lights need to be spatially modulated simultaneously, the method described in U.S. Pat. No. 7,547,114 will not work. Let's take the example of three digital light processor (DLP) projectors, shown in FIG. 2. Here, the white light from a lamp 201 and reflector 202 is condensed by the lens 203, homogenized by the integration rod 205, and relayed to a TIR prisms plus Philips type prisms 212 by a lens group containing lens 206, 207 and 208. White light is separated to red, green and blue lights by the Philips type prisms and arrive at the corresponding digital micromirror devices (DMD) 209, 210 and 211. Each of the colored light is spatially modulated simultaneously. The modulated colored light is combined together by the Philips type prisms again and sent to a projection lens 213.

Based on the optical architecture of the above three-DLP systems, a light source with a wide spectrum that covers red, green and blue is desired. As shown in FIG. 3, one of the possible ways to provide such a light source is to change the multi-phosphor segments to three separate and individual single color phosphor devices and combine the three colored light together by a color combiner, such as dichroic filters. In FIG. 3, one excitation source 301 excites a red phosphor wheel 303 and generates red color light, another excitation source 305 excites a green phosphor wheel 307 and generates green color light, and the last source 309 excites a blue phosphor wheel 311 and generates blue color light. To obtain the white light, these three colored lights need to be combined in wavelength domain by using a color combiner 313. As seen in FIG. 4, emission from a red phosphor and emission from a green phosphor are both very wide, and the two spectra have a strong overlap in the wavelength domain.

A typical color combiner's accepted spectral bandwidth is shown in FIG. 5. It is clear that for red color, this color combiner will reject light that has shorter wavelength than 600 nm. However, from FIG. 4, the emission of red phosphor has significant radiant power below 600 nm. Therefore lights emitted by phosphors for each individual color usually have wider spectral bandwidth than the accepted spectral bandwidth of the color combiner. The result is that the light outside of the accepted spectral bandwidth is rejected and wasted. As a result, the multiple individual single color phosphor wheels method has low efficiency if used in multiple SLM systems including three DLP, three LCD or three LCOS projectors.

SUMMARY OF THE INVENTION

Methods and devices according to embodiments of this invention generate multiple color lights at the same excitation/emission spot. The multiple colors are obtained by exciting a wide band phosphor or a combination of multiple phosphors. Since the multiple color lights come from the same location, they can be efficiently split by the current color separation devices of multiple SLP systems.

According to some embodiments of this invention, multiple colored lights are generated from a single moving phosphor device, which could be a rotating phosphor disk, a rotating phosphor drum, or a linearly moving phosphor plate. The reason for a moving device is to lower the thermal generation for individual phosphor particles. The moving of phosphor with respect to the excitation light will convert the phosphor working mode from continuous wave to pulse mode.

In one embodiment, the phosphor device can be coated by a phosphor layer or a mixed phosphors layer. The emission from such single phosphor or mixed phosphors is wide enough to cover more than one wavelength region of the red, green and blue. For example, when a blue light is used as the excitation source, the rotation phosphor device can be coated with a mixture of red and green phosphors. When the blue excitation light reaches the phosphor plate, both green phosphor and red phosphor will be excited. As seen in FIG. 4, the green phosphor's emission spectrum is wide enough to cover some portion of the red wavelength. Therefore, green phosphor emission will not only contribute to green light, but also to red light. Consequently, the red lights illuminating the red channel SLM will receive the emission lights from both green phosphor and red phosphor. As a result, no light is wasted for such a broad emission bandwidth phosphors. The system efficiency is increased. The same is true for green light. The green channel light modulator will receive the emission lights from both green phosphor and red phosphor. Meanwhile, a portion of the blue excitation light can coexist with the phosphor emission light, providing the required blue light component in the output. Therefore, the light output from such a light source covers red, green and blue wavelength regions. For another example, when a UV or near UV light source such as a 405 nm laser diode device is used as the excitation source, the rotating phosphor device is coated with a mixture of three or even four phosphors, such as red, green, yellow and blue phosphors. The 405 nm excitation light will generate red, green, yellow and blue phosphor emission. The total output of the light source will have a full visible spectrum, covering red, green and blue wavelength regions, which are required by the display applications.

The present invention relates to a method that can optimize the efficiency of a light source that is used in a multiple SLM system. The method uses a moving wavelength conversion material that has a wide spectrum emission, which covers more than one wavelength regions out of red, green and blue. The moving wavelength conversion material is composed of one or multiple mixed phosphors. The moving wavelength conversion material is excited by an excitation source. The wavelength conversion material is uniformly provided in the direction of the relative moving direction of the moving device. Therefore the light output has constant spectrum as well as constant intensity output in the time domain when it is operating. Using this method, the light source can be very energy efficient for projection systems that have more than one channel of SLMs.

A secondary light source may be added after the moving phosphor wheel to either supply one of the colors not generated by the phosphor wheel, or to supplement a color generated by the phosphor wheel if it has insufficient intensity.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a solid state light source device which includes: an excitation light source for generating an excitation light; a wavelength conversion device disposed to receive the excitation light and having one or more wavelength conversion materials for converting at least some of the excitation light into a converted light, wherein the excitation light source and the wavelength conversion device are moveable relative to each other such that different locations of the wavelength conversion device is illuminated by the excitation light at different times, and wherein the wavelength conversion device outputs a first output light which is a broad band light including two or more primary color components and having constant intensity and spectrum as a function of time; a second light source generating a second color light; and a light combination device for combining the first output light outputted by the wavelength conversion device and the second light generated by the second light into one beam of light. The second light source may generate a blue or red light.

In another aspect, the present invention provides a method for generating a broad band light, which includes: generating an excitation light by an excitation light source; illuminating the excitation light on a wavelength conversion device, the wavelength conversion device having one or more wavelength conversion materials for converting at least some of the excitation light into a converted light, including: moving the excitation light source or the wavelength conversion device or optics disposed between the excitation light source and the wavelength conversion device to illuminate different locations of the wavelength conversion device by the excitation light at different times, wherein the wavelength conversion device outputs a first output light which is a broad band light including two or more primary color components and having constant intensity and spectrum as a function of time; generating a second color light by a second light source; and combining the first output light outputted by the wavelength conversion device and the second light generated by the second light into one beam of light by a light combination device. The second light source may generate a blue or red light.

In another aspect, the present invention provides a projection system which includes: a solid state light source device including: an excitation light source for generating an excitation light; a wavelength conversion device disposed to receive the excitation light and having one or more wavelength conversion materials for converting at least some of the excitation light into a converted light, wherein the excitation light source and the wavelength conversion device are moveable relative to each other such that different locations of the wavelength conversion device is illuminated by the excitation light at different times, and wherein the wavelength conversion device outputs a first output light which is a broad band light including two or more primary color components and having constant intensity and spectrum as a function of time; a second light source generating a second color light; and a first light combination device for combining the first output light outputted by the wavelength conversion device and the second light generated by the second light into one beam of light; a light separation device for separating the one beam of light into two or more primary color lights traveling in different directions; two or more spatial light modulators, each for modulating one of the two or more primary color lights; and a second light combination device for combining the two or more modulated primary color lights into an output beam for projection.

It is to be understood that both the foregoing general description and the following detailed description are exemplary and explanatory and are intended to provide further explanation of the invention as claimed.

BRIEF DESCRIPTION OF THE DRAWINGS

FIGS. 7A-1 to 7A-3 schematically illustrate two phosphor films useful in the light source device of FIG. 6 to generate a constant spectrum and constant intensity output.

FIG. 7B shows an exemplary spectrum of an output of the solid state light source device of FIG. 6.

FIG. 7C shows the spectrum in FIG. 7B at a different scale.

FIG. 14 shows a combined spectrum of three color lights separated from a broad band light by a color separation device of FIG. 12A or 12B.

FIGS. 15A and 15B show a solid state light source device using a linearly moving phosphor plate.

DETAILED DESCRIPTION OF THE PREFERRED EMBODIMENTS

Multiple embodiments are described below to illustrate the method and apparatus of the present invention.

Figure 1:
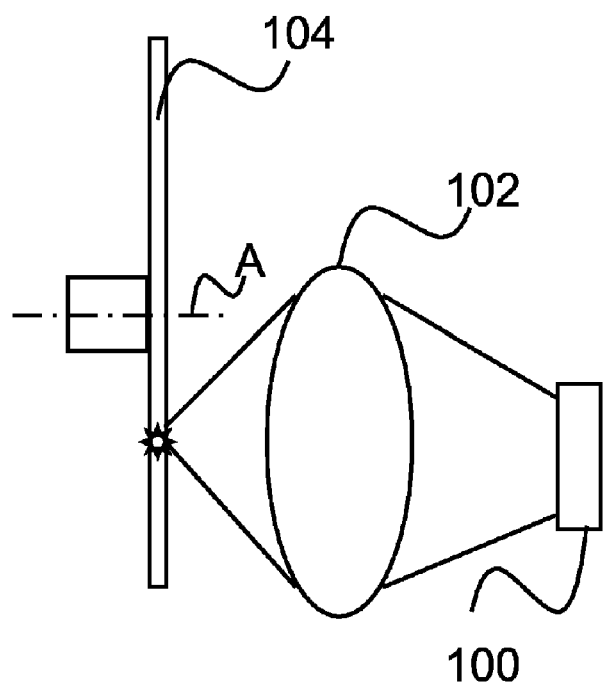
FIG. 1 shows a solid state light source structure (prior art).
Figure 2:
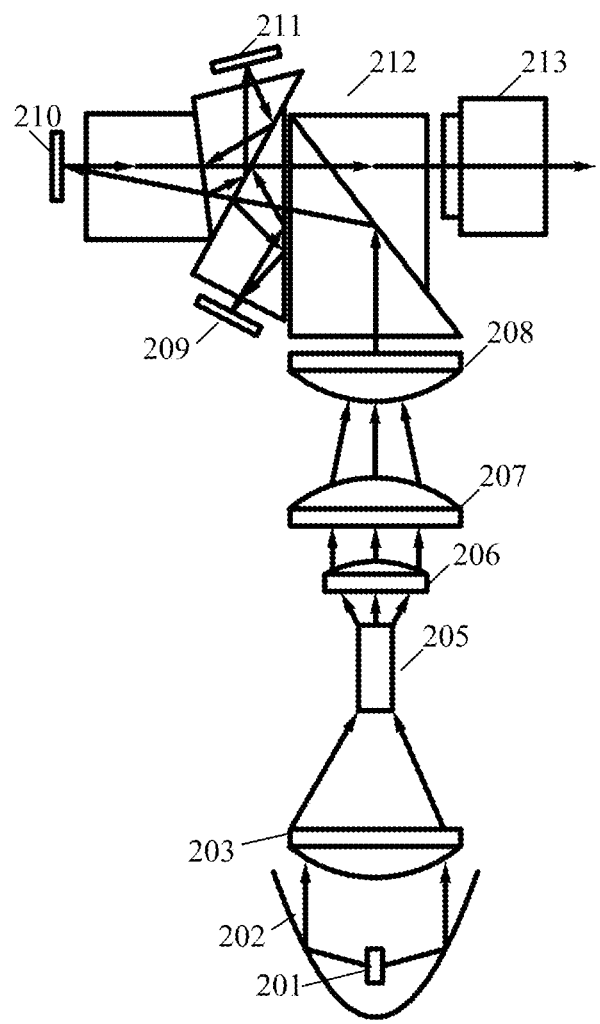
FIG. 2 shows a three DLP projector's optical structure (prior art).
Figure 6:
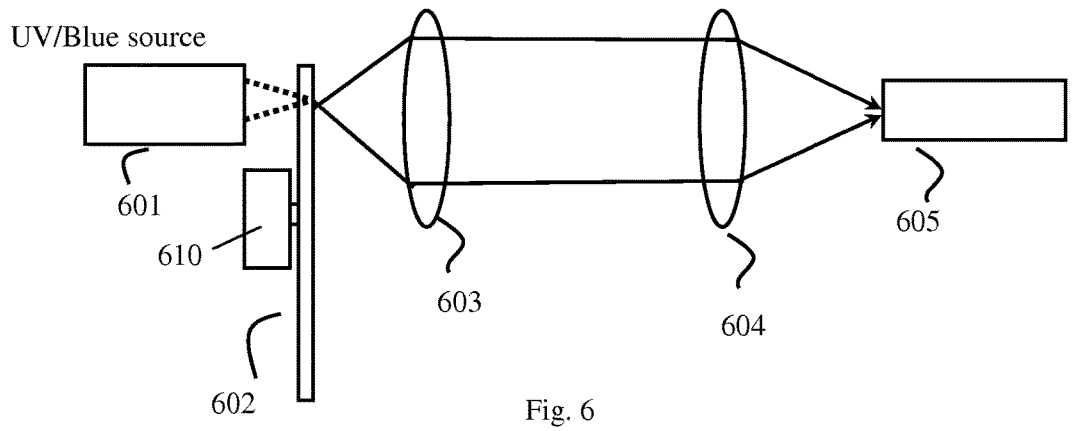
FIG. 6 shows a solid state light source device according to one embodiment of the present invention which uses a transmitting phosphor wheel to generate a constant wide spectrum output containing red, green and blue wavelength regions.
Figures 1, 2, 7A:
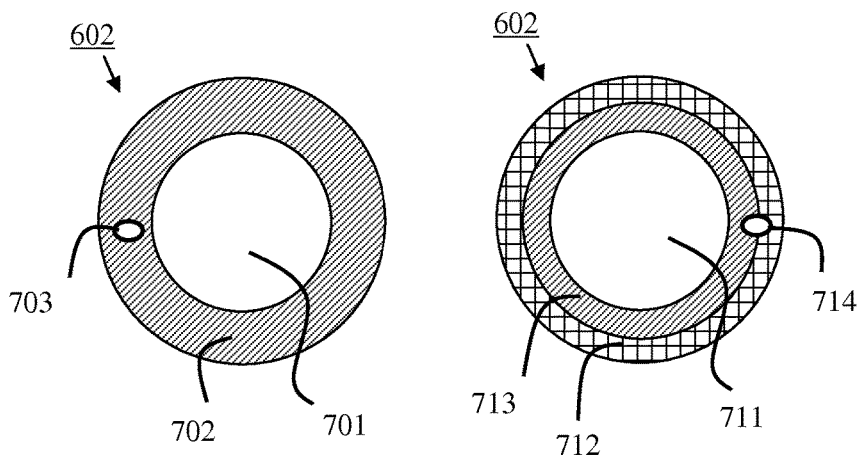
Figures 3, 7A:
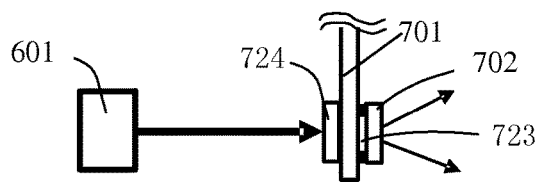
Figure 7:
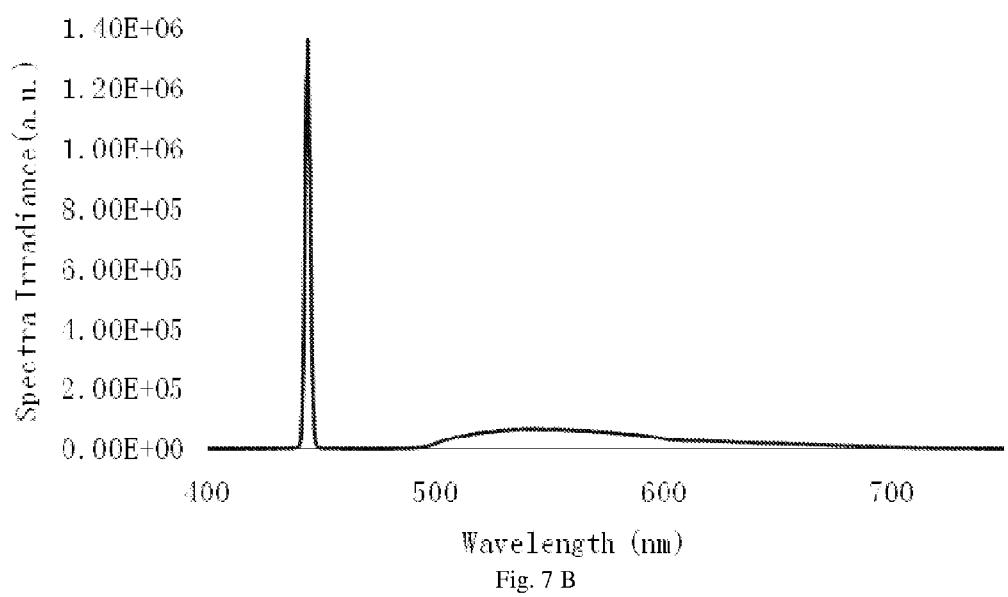
Figure 7:
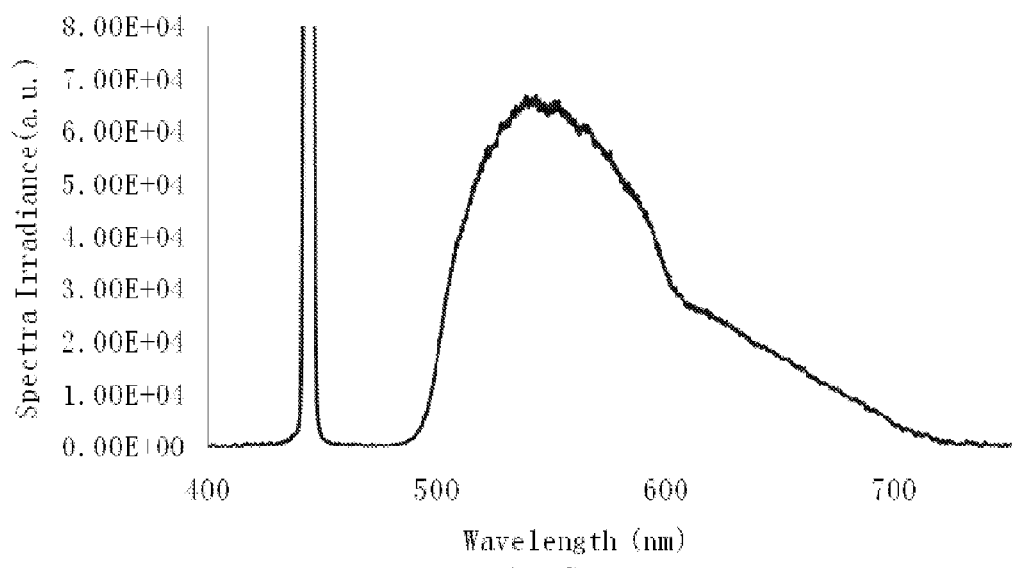

FIG. 6 shows a solid state light source device according to one embodiment of the present invention. The device includes one excitation light source 601, which may be a blue source or a UV/near UV source. A phosphor wheel 602 is mounted on and driven to rotate around an axis by a drive device 610. A wavelength conversion material such as phosphor on the wheel 602 is excited by the excitation light source 601 and emits a converted light having longer wavelengths. The light from by the phosphor wheel is collected by collection optics 603 and focused on to a homogenization optics 605 by a condense optics 604. Optical components 603, 604 and 605 may be omitted or replaced by other optical components. The Phosphor wheel 602 has a phosphor film or coating on it, as shown in FIGS. 7A-1 and 7A-2. The coating in FIG. 7A-1 is one homogeneous coating 702 on a substrate 701. The excitation light spot 703 illuminates on the phosphor film 702 at the same absolute position when the phosphor wheel is driven to rotate around the axis. Relative to the wheel 602, the light spot 703 moves in a circular fashion to illuminate different portions of the phosphor film 702.

The phosphor coating 702 may be composed of one phosphor material mixed with a binder, or multiple phosphor materials mixed with a binder. The phosphor coating 702 may also be formed of multiple overlapping (i.e. one on top of another) layers of phosphor materials. Each layer is uniform and may contain one or more phosphor materials. Preferably, a layer having phosphor material emitting at relatively longer wavelengths should be located closer to the excitation light source than a layer having phosphor emitting at relatively shorter wavelengths, so as to minimize the absorption of converted light from one phosphor being absorbed by another phosphor. Thus, for example, a red phosphor layer should be located closer to the excitation light source than a green phosphor layer. This is true for both transmissive type phosphor wheels (as in FIG. 6) and reflective type phosphor wheels (as in FIG. 8, described later).

As shown in FIG. 7A-2, the coating may also include more than one phosphor film formed in different regions of a substrate 711, such as concentric phosphor film rings 712 and 713, which are two separate and different phosphor films. For example, the ring 712 may contain red phosphors and the ring 713 may contain green phosphors. The excitation light spot 714 is located on both of the two phosphor films. The benefit of having two or more separate phosphor films of different phosphor materials is to diminish the cross talk between different phosphor materials due to the fact that some light emission from one phosphor could be reabsorbed by another phosphor, thus decreasing the two phosphors' total conversion efficiency. Although the phosphor wheel 602 shown in FIG. 7A-2 has multiple segments each containing a different phosphor material, this phosphor wheel is different from conventional phosphor wheels (e.g. the one described in U.S. Pat. No. 7,547,114) in that the when the phosphor wheel 602 rotates, it emits a converted light that has substantially constant color spectrum and intensity in the time domain. In the conventional phosphor wheels, the output light is a time sequence of different colors.

For better display quality, it is preferred that the moving phosphor device generates a constant spectrum and intensity output when the light source is operating. Therefore, the phosphor film or films should be uniform in the moving direction (an angular direction) of the phosphor device.

Figure 3:
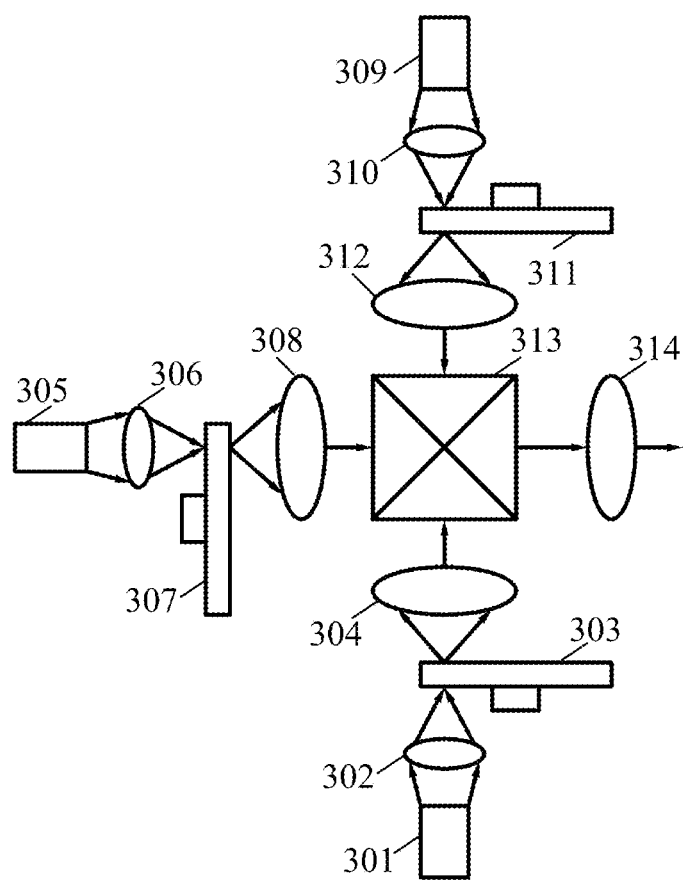
FIG. 3 shows a device for color combining of three colored light.
Figure 4:
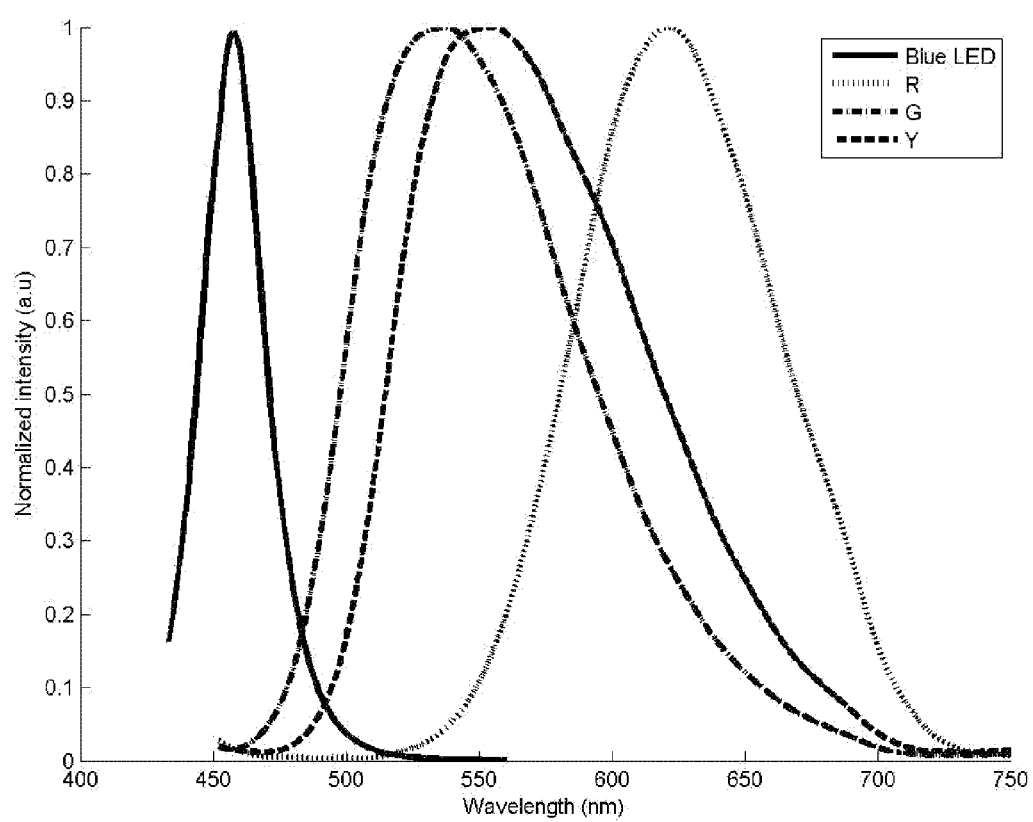
FIG. 4 shows the normalized spectra of a red phosphor, a green phosphor, a yellow phosphor and a blue LED.
Figure 5:
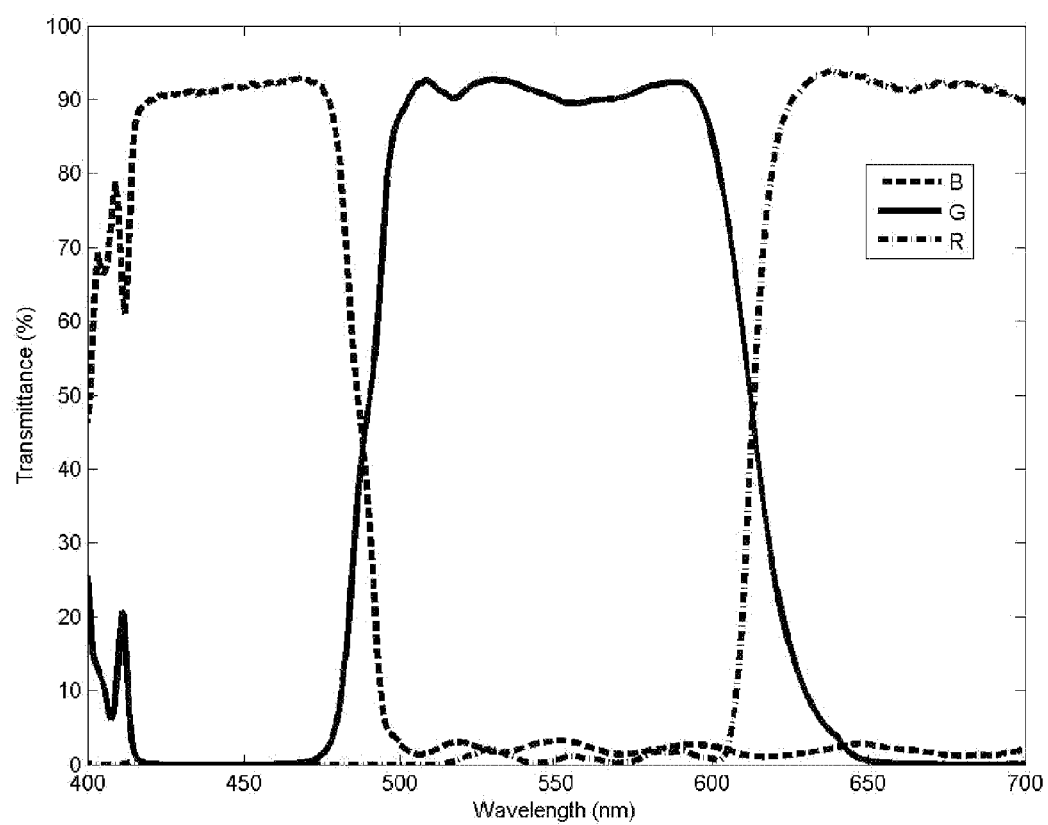
FIG. 5 shows the accepted spectral bandwidth of a color combiner.

In more detail (see FIG. 7A-3), the substrate 701 or 711 may be a dichroic filter, or have a dichroic filter coating 724 on its surface, to transmit the excitation light and reflect the converted light from the phosphor film 702 (or 712/713) to enhance the output power. Preferably, an air gap 723 is formed between the phosphor film 702 (or 712/713) and substrate 701 (or 711), which can increase the conversion efficiency of the phosphor films.

In more detail, the output spectrum of the solid state light source in FIG. 6 is shown in FIGS. 7B and 7C, the latter being presented on a different scale than the former. FIGS. 7B and 7C show that the spectrum has a high peak in the blue region, and a broad continuous spectrum from about 500 nm to 700 nm, which covers both the green and red regions. The color coordinate values of this exemplary spectrum is about (0.311, 0.328) and is perceived as white. The blue peak comes from the transmitted excitation light originated from the excitation light source 601 in FIG. 6, which is not fully absorbed by the phosphor material of the phosphor wheel 602. Controlling the thickness or the density of the phosphor coating can change the blue light transmitted through the phosphor wheel. The broad spectrum from 500 nm to 700 nm comes from phosphor emission from the phosphor wheel 602. The phosphor film may contain one phosphor, such as a yellow phosphor, and may also be a mixture of several phosphors, such as a mixture of green and red phosphors. Changing the phosphor material, the phosphor amount or the proportion of several phosphors can change the output spectrum of the device.

When the excitation source 601 is a UV/near UV light, the phosphor wheel 602 may also include a phosphor that emits in the blue region, in addition to the green and red phosphors.

Figure 8:
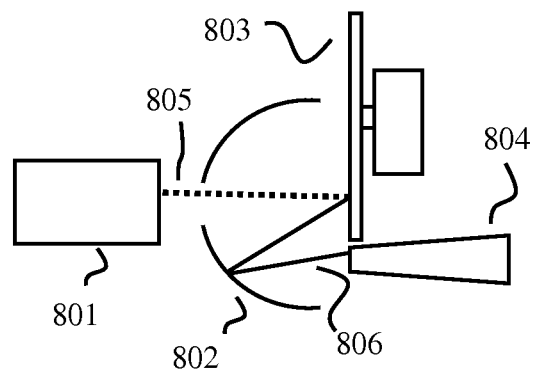
FIG. 8 shows a solid state light source according to another embodiment of the present invention which uses a reflective phosphor wheel to generate a constant wide spectrum emission containing red, green and blue wavelength regions.

A solid state light source device according to another embodiment, shown in FIG. 8, uses a reflective type phosphor wheel. The excitation light source 801 is a blue or UV/near UV light source. The phosphor wheel 803 has a phosphor film having a phosphor layout shown in FIG. 7A-1 or 7A-2. The excitation source 801 generate an excitation light 805, which passes through an aperture of a reflector 802 to impinge on the phosphor wheel 803. The phosphor wheel 803 has a reflector located downstream of the phosphor material in the direction of the excitation light. The reflector may be coated on a substrate of the wheel and the phosphor material may be coated on the reflector coating. The output light 806 from the phosphor wheel is relayed to collection optics 804 by the reflector 802. The reflector 802 may have a spherical shape or an ellipsoidal shape. For a spherical reflector, the illuminated spot on the phosphor wheel 803 and the input port of the collection optics 804 are located at locations symmetrical with respect to the center of the sphere. For an ellipsoidal reflector, they are located on the two focal points of the ellipsoid. The collection optics 804 may be a tapered light tunnel or solid tapered light rod, or it may be a lens group, nonimaging optics, etc.

If the excitation light is a blue light, the output light 806 is a mixture of the converted light emitted by the phosphor film and a portion of the excitation light reflected by the phosphor film without being absorbed.

The phosphor film may contain one wide emission band phosphor, such as a yellow phosphor, or a mixture of several phosphors, such as a mixture of green and red phosphors. Changing the phosphor material, the phosphor amount and the proportion of several phosphors can change the output spectrum of the device. The mixture of the phosphor can be obtained by mixing multiple phosphors uniformly within the same layer, or by having each individual phosphor layer produced separately and then placed on the substrate such as that shown in FIG. 7A-2.

In further detail, non-wavelength conversion materials such as a white diffuse material may be mixed within the phosphor film to increase light scattering. It may be used in the phosphor film shown in FIGS. 7A-1 and 7A-2 to increase reflection of the excitation light to increase its proportion in the output light.

When the excitation source 801 is a UV/near UV light, the phosphor wheel 803 may also include a phosphor that emits in the blue region, in addition to the green and red phosphors.

To summarize, the moving wheel 602 or 803 contains one or multiple wavelength conversion materials which produce, either by themselves or together with unabsorbed excitation light, a broad band output light that has substantially constant color spectrum and intensity as a function of time as the wheel rotates. In this disclosure, a broad band light refers to a light that contains at least two of the three primary colors, e.g., at least two of the red, green and blue lights. Such a light can be separated by a color separation device into the at least two primary color lights.

Figure 9:
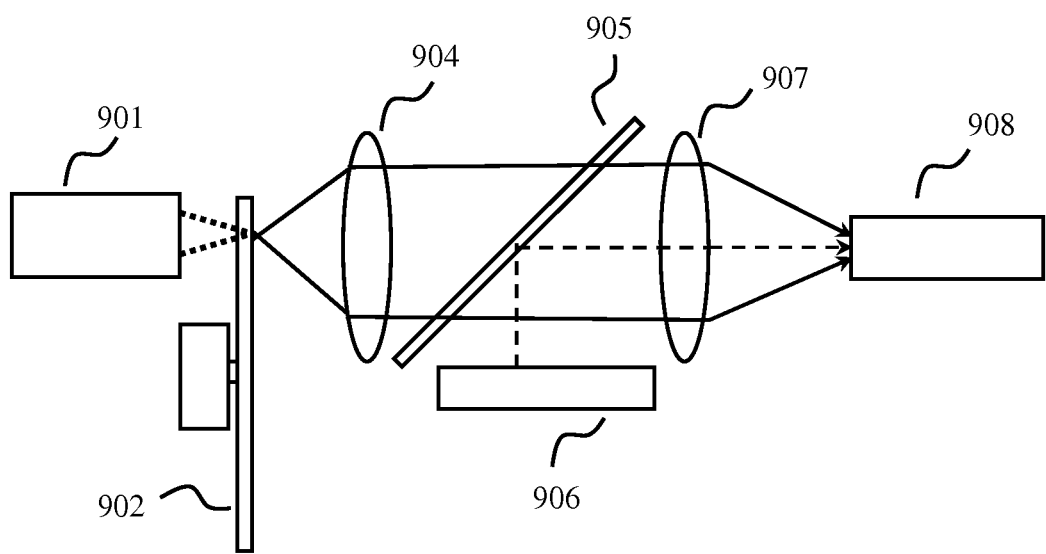
FIG. 9 shows a solid state light source according to another embodiment of the present invention which uses a transmitting phosphor wheel to generate a constant wide spectrum emission, plus a second blue source, which collectively generate an output of the light source containing red, green and blue wavelength regions.

A solid state light source device according to another embodiment of the present invention is shown in FIG. 9. This device is similar to the device shown in FIG. 6, where components 901, 902, 903, 907 and 908 are similar to components 601, 602, 603, 604 and 605, but with another blue source 906 added. This embodiment is useful when blue excitation light is transmitted through the phosphor wheel 902, or when the phosphor wheel 902 is excited by a UV/near UV source but has insufficient emission intensity in the blue region. A dichroic filter 905 can be used as a light combination device to combine the light from the phosphor wheel and the light from the blue source 906 into one beam. The blue source 906 may be a blue LED source, or a blue laser diode source.

Figure 10:
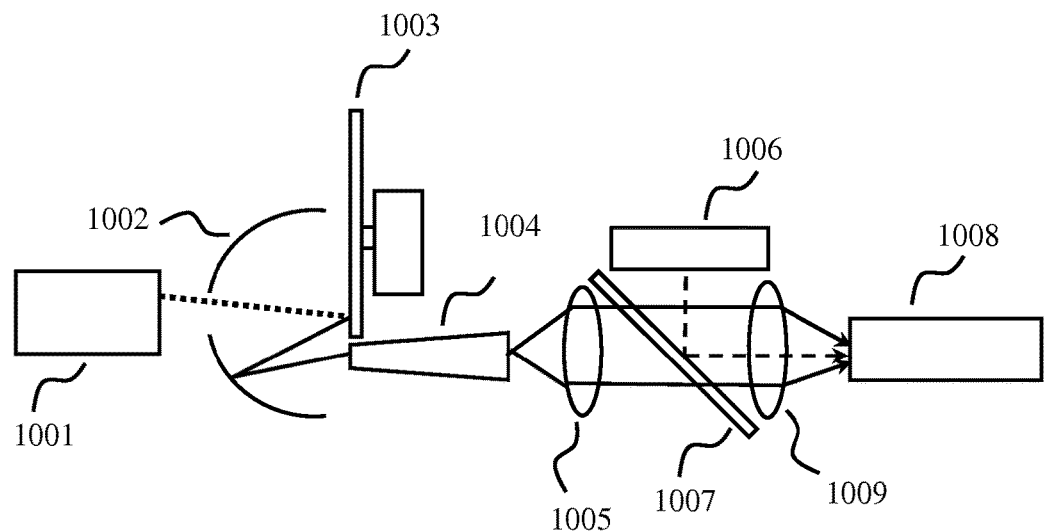
FIG. 10 shows a solid state light source according to another embodiment of the present invention which uses a reflective phosphor wheel to generate a constant wide spectrum emission, plus a second blue source, which collectively generate an output of the light source containing red, green and blue wavelength regions.

A solid state light source device according to another embodiment of the present invention is shown in FIG. 10. This device is similar to the device shown in FIG. 8, where components 1001, 1002, 1003 and 1004 are similar to components 801, 802, 803 and 804, but with another blue source 1006 added. This embodiment is useful when insufficient blue excitation light is reflected by the phosphor wheel 1003, or when the phosphor wheel 1003 is excited by a UV/near UV source but has insufficient emission intensity in the blue region. A dichroic filter 1007, along with lenses 1005 and 1009, can be used to combine the light from the phosphor wheel and the light from the blue source 1006. Homogenization optics 1008 may be provided. The blue source 1006 may be a blue LED source, or a blue laser diode source.

Figure 11:
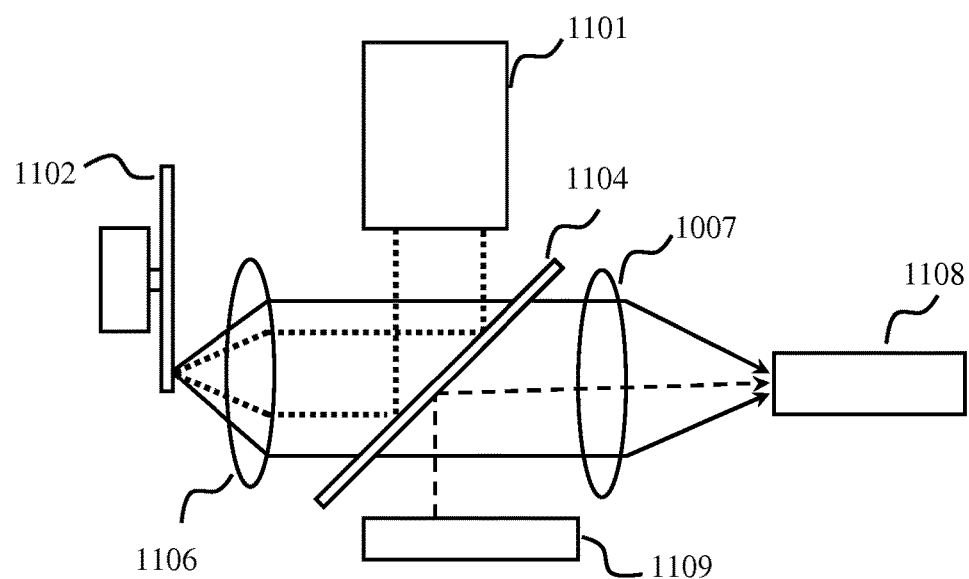
FIG. 11 shows a solid state light source according to another embodiment of the present invention which uses a reflective phosphor wheel to generate a constant wide spectrum emission, plus a second blue source, which collectively generate an output of the light source containing red, green and blue wavelength regions.

A solid state light source device according to another embodiment is shown in FIG. 11. This device is also based on a reflective type phosphor wheel. The excitation light source 1101 is a blue or UV/near UV source. The light from the light source 1101 is reflected by a dichroic filter 1104 and focused to the phosphor wheel 1102 by a condensing optics 1106 (which is also the collection optics for the phosphor emission). When the excitation source 1101 is a blue source, the dichroic filter 1104 reflects the blue light and transmits green, yellow, and red lights. The broad band emission light from the phosphor wheel 1102 is collected by the collection optics 1106. The red and green components of the collected light will be transmitted through the dichroic filter 1104 but the blue light will be blocked. A second blue light source 1109 is added to provide the blue component in the output light. When the excitation source 1101 is a UV or near UV light source, and the phosphor wheel 1102 has insufficient blue light emission, the second blue source 1109 is also useful to supplement the blue component. However, if the excitation source is a UV/near UV light source, the dichroic filter 1104 reflects UV/near UV but transmits blue, green and red lights, and the phosphor wheel 1102 emits sufficient blue light, then the second blue source 1109 may be omitted.

To summarize, in the embodiments shown in FIGS. 9-11, the second light source 906, 1006 and 1109 provides a color light to supplement a color component that has an insufficient intensity or is missing from the output of the phosphor plate 902, 1003 and 1102. The color light from the second light source is combined with the broad band light from the phosphor plate 902, 1003 and 1102. In these embodiments, the second light source 906, 1006 and 1109 may also be red, green or other color sources. For example, emission of red phosphors is often relatively weak, so a secondary red light source may supplement the intensity of the red component.

The advantage of the light sources according to embodiments of the present invention includes energy efficiency, lower cost, and compatibility with current multiple SLM projectors.

Referring back to FIG. 2, the light source of this conventional multiple SLM projector system, made up of components 201, 202, 203 and 205, can be replaced by a solid state light source device described in any of the above embodiments of the present invention. The color separation device 212 separates the broad band light produced by such solid state light source device into three color lights (such as three primary color lights), which are separately and simultaneously modulated by the DMDs 209, 210 and 211.

When a second light source is provided, as in the embodiments of FIGS. 9-11, the dichroic devices 905, 1007 and 1104 may be omitted; i.e., the light from the second light source 906, 1006 or 1109 is not combined with the light from the phosphor plate into one beam. In such a situation, the broad band light can be separated into two color components (e.g. red and green) to be inputted to two DMDs and the light from the second source (e.g. blue) can be directly inputted to the third DMD without color combination and color separation.

Figure 12A:
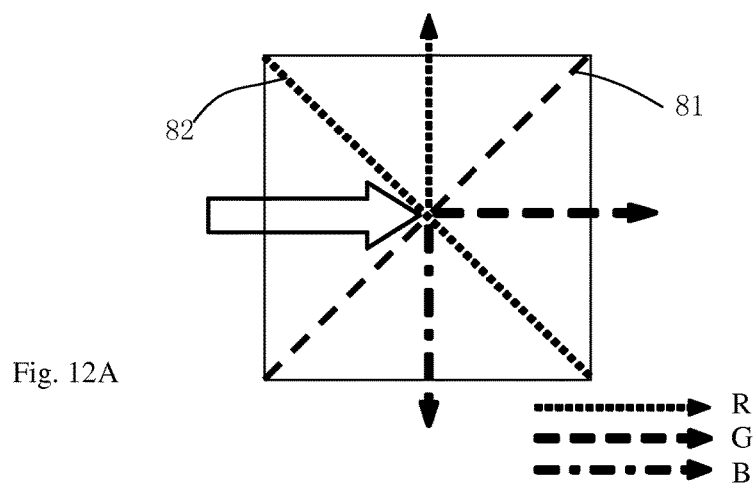
FIGS. 12A and 12B show examples of color separation devices useful in embodiments of the present invention.
Figure 12B:
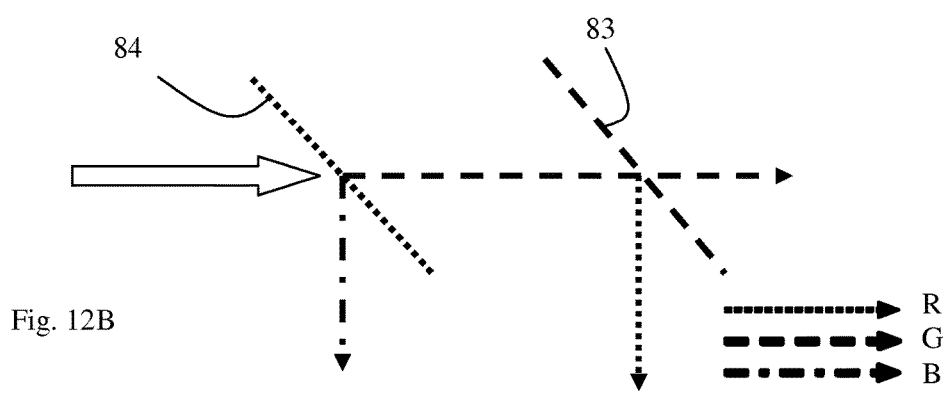
Figure 13:
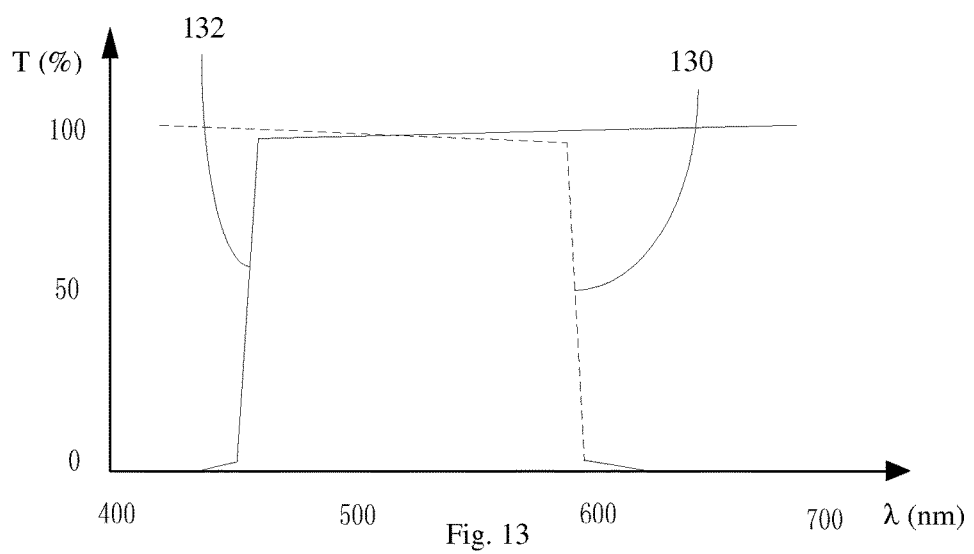
FIG. 13 shows spectral characteristics of dichroic filters used in the devices of FIGS. 12A and 12B.

Although the color separation device in the conventional multiple SLM projector system of FIG. 2 uses a TIR prisms plus Philips type prisms 212, any other suitable color separation devices may be used. Two examples are shown in FIGS. 12A and 12B which uses two dichroic filters. FIG. 13 illustrates the spectral characteristics of the two dichroic filters. In the example of FIG. 12A, two dichroic filters 81 and 82 are disposed perpendicular to each other. A broad band light is illuminated on the two dichroic filters 81 and 82 at 45 degree angles. The first dichroic filter 81 is a low-pass filter with a transmission spectrum shown as curve 130 in FIG. 13. More specifically, this filter reflects red light and transmits green and blue lights. The second dichroic filter 82 is a high-pass filter with a transmission spectrum shown as curve 132 in FIG. 13. More specifically, this filter reflects blue light and transmits green and red lights. Thus, by using the dichroic filters 81 and 82 in combination, the broad band input light is separated into red, green and blue lights, the combined spectrum of which are shown in FIG. 14, which shows the relative intensity (I) of the three colors. Comparing the spectra in FIGS. 7B and 14, it can be seen that the total output power of the color separation device has a rather small (approximately 4%) loss compared to the input broad band light.

In the example of FIG. 12B, two dichroic filters 83 and 84 are disposed in parallel to each other. The filters 83 and 84 are similar to filters 81 and 82, respectively, and their transmission spectra are shown in FIG. 13 as curves 130 and 132, respectively. In addition to the configurations shown in FIGS. 12A and 12B, other configurations of the two dichroic filters can be used to achieve the goal of separating the optical paths of the different color lights using reflection and transmission. If the broad band light only needs to be separated into two color lights, one dichroic filter is sufficient. Many other devices can be used to achieve color separation and they are not described here.

In the embodiments shown in FIGS. 6 to 7A-3 and 8 to 11, the phosphor wheels 602, 803, 902, 1003 and 1102 have a round shape and move relative to the excitation light source by rotating around an axis. In alternative embodiments, the wheel may be replaced by a moving plate that moves linearly relative to the excitation light source. One example is shown in FIGS. 15A and 15B.

The solid state light source device shown in FIG. 15A includes an excitation light source 91 for generating an excitation light, a moving phosphor plate 92 including a substrate 921 and a phosphor layer 922 on the substrate, and a drive device 93 for moving the plate 92 relative to the light source 91. In this embodiment, the drive device 93 drives the plate 92 to oscillate linearly in the directions indicated by arrows D1, so that the excitation light is illuminated on the phosphor plate 92 along a linear path in an oscillating manner. As shown in FIG. 15B, the phosphor coating in this embodiment has a band shape where its longer direction is parallel to the direction of movement D1. Preferably, an air gap is provided between the phosphor layer 922 and the substrate 921 to enhance the conversion efficiency of the phosphor layer.

More generally, embodiments of the present invention requires a relative movement of the excitation light spot and the phosphor layer so that the light spot does not fixedly illuminate one place of the phosphor layer; any means of achieving this goal may be used. In the above described embodiments, the plate carrying the phosphor layer is driven to move relative to the excitation light. Alternatively, the excitation light source may be driven by a drive device to move relative to the phosphor plate which remains stationary. As another alternative, both the excitation light source and the phosphor plate may remain stationary, and optical components between the excitation light source and the phosphor plate are driven to move, directing the excitation light onto different spots of the phosphor plate. Two examples of the latter approach are shown in FIGS. 16 and 17.

Figure 16:
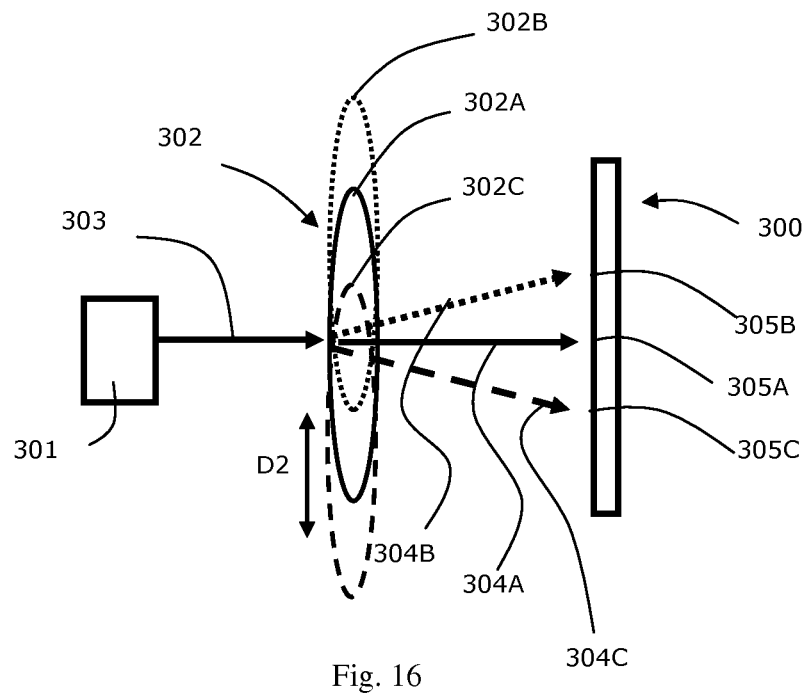
FIGS. 16 and 17 show two examples of solid state light source devices in which moving optical components are disposed between the excitation light source and the phosphor plate.

In FIG. 16, the excitation light 303 from the excitation light source 301 is refracted by a convex lens 302 to illuminate the phosphor plate 300. The lens 302 is driven by a drive device (not shown) to move lineally in an oscillating manner as indicated by the arrow D2, i.e., perpendicular to the optical axis of the lens. When the lens 302 moves to positions 302A, 302B and 302C, the excitation light is refracted to different directions 304A, 304B and 304C, respectively, to illuminate on different locations 305A, 305B and 305C, respectively, of the phosphor plate 300. If the lens 302 oscillates between positions 302B and 302C, the excited light will illuminate on the phosphor plate 300 on a line connecting points 305B and 305C.

Figure 17:
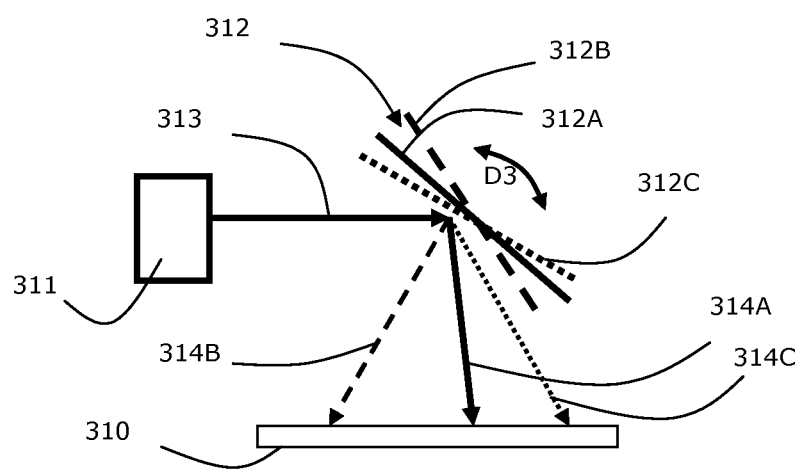

In FIG. 17, the excitation light 313 from the excitation light source 311 is reflected by a reflector 312 to illuminate the phosphor plate 310. The reflector 312 (flat mirror in this example) is driven by a drive device (not shown) to rotate in an oscillating manner around an axis located in the plate of the reflector, as indicated by the arrow D3. When the reflector 312 rotates to positions 312A, 312B and 312C, the excitation light is reflected to different directions 314A, 314B and 314C, respectively, to illuminate on different locations of the phosphor plate 300.

In the devices shown in FIGS. 16 and 17, the path of the light spots illuminated on the phosphor plate 300/310 is a straight line. Alternatively, the lens 302 may be disposed such that the light from the excitation light source 301 is off-axis for the lens, and the lens may be driven to rotate around an axis that does not coincide with its optical axis. This will result in the light spot illuminating the phosphor plate 300 in a circular path. Similarly, the reflector 312 may be disposed at an appropriate angle and driven to rotate around a tilted axis so that the reflected excitation light illuminate the phosphor plate 310 along a circular path.

Any of the above described methods, or combinations thereof, may be used to cause the excitation light to illuminate on different locations of the phosphor plate. This helps prevent overheating of the phosphor material and other problems.

From the above descriptions, it can be seen that, in conventional technologies, a moving plate has multiple segments carrying different colored phosphor materials to sequentially generate multiple colored lights, i.e., the light colors are separated in the time domain. In these technologies, to achieve high quality monochromatic lights, light energy loss is unavoidable. In embodiments of the present invention, the solid state light source devices multiple colored lights at the same time, i.e., the colors are not separated in the time domain. Thus, for each monochromatic light, the unused light energy due to the requirement of high quality monochromatic light can be used to generate another color light at the same time. Thus, the overall light energy utilization efficiency is higher than the conventional technologies.

In embodiments of the present invention, the brightness of each color light after color separation is determined by the specification of the broad band light generated by the solid state light source devices. To achieve stable color light output, the spectrum and intensity of the broad band light should be substantially constant as a function of time. Thus, in preferred embodiments of the present invention, the properties of the wavelength conversion materials (e.g. phosphor) in the wavelength conversion device should be uniform along the illumination path of the excitation light. Further, the excitation light generated by the excitation light source should be stable in time as well.

In embodiments of the present invention, one light source can be used to generate two or more primary color lights. Further, by using the color separation device to separate two or more colors from the broad band light generated by a phosphor plate, lost of light energy in conventional technologies due to filtering of converted light is avoided and energy utilization efficiency is increased.

Further, in the embodiments of FIGS. 9-11, the use of a secondary light source 906/1006/1109 provides flexibility in achieving a broad band output light with desired mix of various color components. In these devices, the color light from the secondary light source is mixed with the broad band light from the wavelength conversion material.

Although best used in multiple SLM projectors, the light source according to embodiments of the present invention can be used in single SLM projectors as well. For example, a single DMD projector uses a color wheel to create sequential colored light. Such a light source has wide spectrum and can generate colored light after passing the color wheel. If a light source that require a second blue source (e.g. FIG. 9, 10 or 11) is used, the excitation source and the second blue source may be pulse driven using a synchronized signal from the color wheel. When the color wheel is rotated to a blue filter region, only the second blue source will be turned on and the excitation source will be turned off. Similarly, when the color wheel is rotated to a red or green region, only the excitation source will be turned on and the second blue source will be turned off. Therefore, some amount of energy can be saved.

It is well known to the industry that other wavelength down conversion material such as quantum dots can serve the similar function as a phosphor material. Phosphors are used in this disclosure as examples, but other suitable wavelengths down conversion materials can be used and are covered by this invention. The method of forming the wavelength conversion material layer on a substrate is well known and not described in detail here.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A solid state light source device comprising:
an excitation light source for generating an excitation light;
a wavelength conversion device disposed to receive the excitation light and having one or more wavelength conversion materials for converting at least some of the excitation light into a converted light,
wherein the excitation light source and the wavelength conversion device are moveable relative to each other such that different locations of the wavelength conversion device is illuminated by the excitation light at different times, and wherein the wavelength conversion device outputs a first output light which is a broad band light including two or more primary color components and having constant intensity and spectrum as a function of time;
a curved reflector having an aperture, wherein the excitation light from the excitation light source passes through the aperture to impinge on the wavelength conversion device, wherein the excitation light source and an area of the wavelength conversion device illuminated by the excitation light are located on opposite sides of the curved reflector;
a collection optics having an input port and an output port, the collection optics being disposed on the same side of the curved reflector as the area of the wavelength conversion device illuminated by the excitation light, wherein either the curved reflector has a spherical shape and the area of the wavelength conversion device illuminated by the excitation light and the input port of the collection optics are located at two respective locations that are symmetrical to each other with respect to a spherical center of the spherical shape, or the curved reflector has an ellipsoidal shape and the area of the wavelength conversion device illuminated by the excitation light and the input port of the collection optics are located respectively at two focal points of the ellipsoid spherical shape, wherein the curved reflector reflects the first output light from the wavelength conversion device to the input port of the collection optics, and wherein the collection optics guides the first output light to exit the output port;
a second light source generating a second color light; and
a light combination device disposed to receive the first output light from the output port of the collection optics and for combining the first output light outputted by the wavelength conversion device, after reflection by the curved reflector and guided through the collection optics, and the second light generated by the second light into one beam of light, wherein the first output light is reflected by the curved reflector from the wavelength conversion device to the input port of the collection optics and then guided to the light combination device without passing through the aperture of the curved reflector.

2. The solid state light source device of claim 1, wherein the excitation light is a blue light, wherein the wavelength conversion materials include a red phosphor material and a green phosphor material, wherein the wavelength conversion device passes a part of the blue excitation light as a part of the first output light, and wherein the second color light is a blue light.

3. The solid state light source device of claim 1, wherein the excitation light is a blue light, wherein the wavelength conversion materials include a yellow phosphor material, wherein the wavelength conversion device passes a part of the blue excitation light as a part of the first output light, and wherein the second color light is a blue light.

4. The solid state light source device of claim 1, wherein the excitation light is a UV or near UV light, wherein the wavelength conversion materials include a red phosphor material and a green phosphor material, and wherein the second color light is a blue light.

5. The solid state light source device of claim 1, wherein the excitation light is a UV or near UV light, wherein the wavelength conversion materials include a yellow phosphor material, and wherein the second color light is a blue light.

6. The solid state light source device of claim 1, wherein the second light source generates a red light.

7. The solid state light source device of claim 1, wherein the wavelength conversion device includes a substrate, and a first layer of a first phosphor material and a second layer of a second phosphor material carried on the substrate, wherein the first and second layers overlap each other.

8. The solid state light source device of claim 7, wherein a converted light emitted by the first phosphor material has a longer wavelength range than a converted light emitted by the second phosphor material, and wherein the first layer is located closer to the excitation light source than the second layer.

9. A method for generating a broad band light, comprising:

generating an excitation light by an excitation light source;

illuminating the excitation light such that it passes through an aperture in a curved reflector to impinge on a wavelength conversion device, the excitation light source and an area of the wavelength conversion device illuminated by the excitation light being located on opposite sides of the curved reflector, the wavelength conversion device having one or more wavelength conversion materials for converting at least some of the excitation light into a converted light, including:

moving the excitation light source or the wavelength conversion device or optics disposed between the excitation light source and the wavelength conversion device to illuminate different locations of the wavelength conversion device by the excitation light at different times, wherein the wavelength conversion device outputs a first output light which is a broad band light including two or more primary color components and having constant intensity and spectrum as a function of time;

reflecting the first output light by the curved reflector to an input port of a collection optics, the collection optics being disposed on the same side of the curved reflector as the area of the wavelength conversion device illuminated by the excitation light, wherein either the curved reflector has a spherical shape and the area of the wavelength conversion device illuminated by the excitation light and the input port of the collection optics are located at two respective locations that are symmetrical to each other with respect to a spherical center of the spherical shape, or the curved reflector has an ellipsoidal shape and the area of the wavelength conversion device illuminated by the excitation light and the input port of the collection optics are located respectively at two focal points of the ellipsoid spherical shape;

guiding the first output light by the collection optics from the input port to exit an output port of the collection optics;

generating a second color light by a second light source; and combining the first output light outputted by the wavelength conversion device, after it has been reflection by the curved reflector and guided to exit the output port of the collection optics, and the second light generated by the second light into one beam of light by a light combination device, wherein the first output light is reflected by the curved reflector from the wavelength conversion device to the input port of the collection optics and then guided to the light combination device without passing through the aperture of the curved reflector.

10. The method of claim 9, wherein the excitation light is a blue light, wherein the wavelength conversion materials include a red phosphor material and a green phosphor material, wherein the wavelength conversion device passes a part of the blue excitation light as a part of the first output light, and wherein the second color light is a blue light.

11. The method of claim 9, wherein the excitation light is a blue light, wherein the wavelength conversion materials include a yellow phosphor material, wherein the wavelength conversion device passes a part of the blue excitation light as a part of the first output light, and wherein the second color light is a blue light.

12. The method of claim 9, wherein the excitation light is a UV or near UV light, wherein the wavelength conversion materials include a red phosphor material and a green phosphor material, and wherein the second color light is a blue light.

13. The method of claim 9, wherein the excitation light is a UV or near UV light, wherein the wavelength conversion materials include a yellow phosphor material, and wherein the second color light is a blue light.

14. The method of claim 9, wherein the second light source generates a red light.

15. The method of claim 9, wherein the wavelength conversion device includes a substrate, and a first layer of a first phosphor material and a second layer of a second phosphor material carried on the substrate, wherein the first and second layers overlap each other.

16. The method of claim 15, wherein a converted light emitted by the first phosphor material has a longer wavelength range than a converted light emitted by the second phosphor material, and wherein the first layer is located closer to the excitation light source than the second layer.

17. A projection system comprising:

a solid state light source device comprising:

an excitation light source for generating an excitation light;

a wavelength conversion device disposed to receive the excitation light and having one or more wavelength conversion materials for converting at least some of the excitation light into a converted light, wherein the excitation light source and the wavelength conversion device are moveable relative to each other such that different locations of the wavelength conversion device is illuminated by the excitation light at different times, and wherein the wavelength conversion device outputs a first output light which is a broad band light including two or more primary color components and having constant intensity and spectrum as a function of time;

a curved reflector having an aperture, wherein the excitation light from the excitation light source passes through the aperture to impinge on the wavelength conversion device, wherein the excitation light source and an area of the wavelength conversion device illuminated by the excitation light are located on opposite sides of the curved reflector;

a collection optics having an input port and an output port, the collection optics being disposed on the same side of the curved reflector as the area of the wavelength conversion device illuminated by the excitation light, wherein either the curved reflector has a spherical shape and the area of the wavelength conversion device illuminated by the excitation light and the input port of the collection optics are located at two respective locations that are symmetrical to each other with respect to a spherical center of the spherical shape, or the curved reflector has an ellipsoidal shape and the area of the wavelength conversion device illuminated by the excitation light and the input port of the collection optics are located respectively at two focal points of the ellipsoid spherical shape, wherein the curved reflector reflects the first output light from the wavelength conversion device to the input port of the collection optics, and wherein the collection optics guides the first output light to exit the output port;

a second light source generating a second color light; and a first light combination device disposed to receive the first output light from the output port of the collection optics and for combining the first output light outputted by the wavelength conversion device, after reflection by the curved reflector and guided through the collection optics, and the second light generated by the second light into one beam of light, wherein the first output light is reflected by the curved reflector from the wavelength conversion device to the input port of the collection optics and then guided to the first light combination device without passing through the aperture of the curved reflector;

a light separation device for separating the one beam of light into two or more primary color lights traveling in different directions;

two or more spatial light modulators, each for modulating one of the two or more primary color lights; and a second light combination device for combining the two or more modulated primary color lights into an output beam for projection.

18. The projection system of claim 17, wherein the second light source generates a blue light or a red light.

19. The projection system of claim 17, wherein the wavelength conversion device includes a substrate, and a first layer of a first phosphor material and a second layer of a second phosphor material carried on the substrate, wherein the first and second layers overlap each other.

20. The projection system of claim 19, wherein a converted light emitted by the first phosphor material has a longer wavelength range than a converted light emitted by the second phosphor material, and wherein the first layer is located closer to the excitation light source than the second layer.

* * * * *